(12) United States Patent
Hein et al.

(10) Patent No.: US 7,508,350 B2
(45) Date of Patent: *Mar. 24, 2009

(54) ANTENNA CORE

(75) Inventors: Herbert Hein, Freigericht (DE); Wulf Guenther, Maintal (DE); Harald Hundt, Dieburg (DE); Achim Kipper, Buchköbel (DE); Matthias Reidel, Ronneburg (DE)

(73) Assignee: Vacuumschmelze GmbH & Co. KG, Hanau (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/187,466

(22) Filed: Jul. 22, 2005

(65) Prior Publication Data

US 2006/0022886 A1 Feb. 2, 2006

Related U.S. Application Data

(63) Continuation of application No. PCT/EP03/00699, filed on Jan. 23, 2003.

(51) Int. Cl.
*H01Q 1/00* (2006.01)
(52) U.S. Cl. .................. 343/787; 343/788
(58) Field of Classification Search .......... 343/713, 343/787, 788
See application file for complete search history.

(56) References Cited

U.S. PATENT DOCUMENTS

| | | | |
|---|---|---|---|
| 4,150,981 A | 4/1979 | O'Handley | 75/170 |
| 4,483,724 A | 11/1984 | Hasegawa | 148/31.55 |
| 4,709,471 A | 12/1987 | Valencic et al. | 29/605 |
| 5,083,366 A | 1/1992 | Arakawa et al. | 29/605 |
| 5,181,311 A | 1/1993 | Lee | 29/609 |
| 5,408,243 A * | 4/1995 | D'Hont | 343/718 |
| 5,567,537 A | 10/1996 | Yoshizawa et al. | 428/692 |
| 5,625,366 A | 4/1997 | D'Hont | 343/718 |
| 5,638,080 A * | 6/1997 | Orthmann et al. | 343/788 |
| 2002/0033777 A1 | 3/2002 | Maruyama et al. | 343/713 |
| 2006/0017642 A1* | 1/2006 | Herzer et al. | 343/787 |

FOREIGN PATENT DOCUMENTS

| | | |
|---|---|---|
| DE | 40 02 999 A1 | 2/1990 |
| DE | 41 09 840 A 1 | 3/1991 |
| DE | 41 09 840 A1 | 3/1991 |
| DE | 195 13 607 A1 | 4/1995 |
| DE | 195 13 607 C2 | 4/1995 |
| EP | 0 121 649 | 1/1984 |

(Continued)

OTHER PUBLICATIONS

International Search Report, PCT/EP03/00699, 4 Pgs, Nov. 6, 2003.

(Continued)

*Primary Examiner*—Tho G Phan
(74) *Attorney, Agent, or Firm*—Baker Botts L.L.P.

(57) ABSTRACT

A highly bendable antenna core (8) which is highly bendable for high-frequency identification systems substantially retains its soft-magnetic properties when bending occurs. The antenna core is produced by using specific amorphous or nanocrystalline alloys having a very low magnetostriction value. The antenna core (8) is embodied in the form of a laminate with/or without insulating layers placed therebetween. An antenna can be provided with one such antenna core.

24 Claims, 5 Drawing Sheets

FOREIGN PATENT DOCUMENTS

| | | |
|---|---|---|
| EP | 0 256 347 A1 | 7/1987 |
| EP | 0 401 805 A2 | 6/1990 |
| EP | 0 554 581 A1 | 2/1992 |
| EP | 0 762 535 B1 | 8/1996 |
| JP | 60233904 | 11/1985 |
| JP | 60233904 A | 11/1985 |
| JP | 05 267 922 | 10/1993 |
| JP | 5267922 A | 10/1993 |
| JP | 2002261524 | 9/2002 |
| JP | 2002261524 A | 9/2002 |

OTHER PUBLICATIONS

International Search Report for International Application No. PCT/EP2004/000235 (5 pages), Oct. 4, 2004.

International Preliminary Report on Patentability for International Application No. PCT/EP2004/000235 (7 pages), Sep. 2, 2005.

* cited by examiner

ANTENNA CORE

CROSS-REFERENCE TO RELATED APPLICATIONS

This application is a continuation of co-pending International Application No. PCT/EP2003/00699 filed Jan. 23, 2003.

TECHNICAL FIELD

The invention concerns an antenna core with a length of at least 80 mm with at least one flexible soft magnetic element made of an amorphous or nanocrystalline alloy, as well as a method for production of such an antenna core, a method for production of an antenna and use of such an antenna core.

BACKGROUND

EP 0554581 B1 discloses a laminated magnetic core for an antenna, used for an identity card or a credit card-like card, and consisting of a stack of amorphous magnetic layers and film-like non-conducting layers arranged in between, for example, made of plastic. Flexibility is required of the antenna presented there, if it is exposed as an identity card to certain mechanical loads during daily use.

An antenna for a transponder is known from EP 0762535 B1 with a magnetic core consisting of different layers of a soft magnetic material, for example, an amorphous magnetic material with or without intermediate insulation layers in the form of paper or polymer. As an alternative, casting of strips of magnetic active material with plastics, for example, resins, is also disclosed there. The variant described there is used to create a flexible and rupture-proof antenna.

A magnetic core element for a thin film antenna is known from DE 19513607 C2, in which the magnetic core consists of strips of an amorphous alloy or a nanocrystalline alloy, which can be insulated from each other by insulation strips, in which case separation of the laminate layers by their oxide layers is also mentioned.

A stack of soft magnetic elements is also known, for example, from U.S. Pat. No. 5,567,537, in which the use of certain amorphous and nanocrystalline alloys is described for production of so-called thin film antennas. Among other things, the retention of soft magnetic or other physical properties before and after a bending load is mentioned as a criterion for good usability of such thin film antennas, for example, in chip cards. It is shown, in particular, that such thin film antennas exhibit no cracks after bending loads, in contrast to ferrite rods.

U.S. Pat. No. 5,625,366 discloses a flexible antenna core, consisting of a laminate of different layers of an amorphous alloy, in which a strand-like bundle of strand-like magnetically active elements is additionally mentioned, between which, if necessary, a film insulation can also be provided. In addition, the possibility of producing insulation of the individual elements by an oxide layer or another layer, which can be created, for example, by chemical treatment of the magnetic elements, is also mentioned.

For actually strongly deformable antennas, especially longer bulky antennas with a wire winding, the amorphous and nanocrystalline alloys already known from the cited prior art, as well as the internal structure of the antenna cores, are only suitable with considerable restriction. In vehicle access systems, only non-deformable ferrite cores have thus far been used.

SUMMARY

None of the known antennas therefore offers perfect function in the bent state.

The task of the present invention is therefore to provide an antenna core that guarantees strong deformability of the antenna without significantly altering the magnetic properties of the antenna by deformation.

In addition, the task of the invention is to provide a production method for such an antenna core that can be used cost effectively and industrially, and an antenna with such an antenna core.

The task is solved according to the invention in that the amorphous or nanocrystalline alloy has a magnetostriction value $\lambda_s$ in the range from $4 \cdot 10^{-6}$ to $-4 \cdot 10^{-6}$. The alloy then preferably has a magnetostriction value $\lambda_s$ in the range from $1 \cdot 10^{-6}$ to $-1 \cdot 10^{-6}$.

With such a low magnetostriction, the antenna core is very insensitive to bending, in terms of its magnetic properties.

The amorphous or nanocrystalline alloy can also have a linear B-H loop, in which the inductance L of the antenna core at 60 kHz, during bending in the middle by 25% of its length, changes by less than 10%.

The quality can be advantageously chosen, so that it is greater than 10 at 60 kHz. Quality is understood to mean the ratio of inductance and resistance multiplied by angular frequency.

Strand-like elements can be prescribed as elements. With particular advantage, however, the elements can also be designed as flat strips with rectangular cross section.

It is then advantageous that the elongated soft magnetic strips have a thickness of 5-30 μm. An antenna core of significant length (for example, greater than 8, especially longer than 30 cm) can be produced from the soft magnetic elements, which can be further processed as an independent self-supporting component to an antenna that can be incorporated in an appropriate site in a larger device (for example, a door handle), or especially in a vehicle.

The invention can also advantageously be implemented, in that the elements are separated from each other by electrically insulating films. The electrically insulating films can consist of plastic. It can be advantageous that the films have a thickness from 0.5 to 30 μm. By using electrically insulating films that preferably consist of plastic and typically have a thickness from 0.5 to 30 μm, laminates are formed that guarantee very good deformability with very limited eddy current losses.

It has been shown in various experiments that the stacks known from the prior art, which were glued with adhesives, like epoxy resin, sometimes led to unreliable insulation between the strip layers of the soft magnetic strips, and therefore deviating quality values. Distortions of the soft magnetic alloys strips occurred that entailed instability of inductances.

The natural insulation layer on the surface of the soft magnetic alloy strips is insufficient in many cases to guarantee high quality values Q and reliable resistance during deformation.

Many soft magnetic alloy strips have a surface structure that varies over the strip length, because of the production process, having elevations and recesses, for example. Such elevations then come in contact with the adjacent strip layers and permit electrical contacting with often deviating transfer resistance, depending on many factors.

The use of plastic insulating films has proven advantageous in special cases, so that antenna cores can be produced, having high and very stable quality values Q. This full-surface insulation between all strip layers suppresses any eddy currents between the individual strip layers. Consequently, not only the thickness of the individual soft magnetic alloy strips, but their electrical conductivity are decisive as criterion for quality. The alloys strips preferably have a thickness form 5 to 30 μm.

In many cases, depending on the requirements of the electrical wiring, the insulation films can be left out, if certain eddy currents can be tolerated.

The mentioned antenna cores are preferably produced by a method according to the invention, having the following steps:

One or more soft magnetic elements are wound to a toroid,
The wound toroid is separated at one site, folded back and reshaped to the elongated antenna core.

Before winding, the elements can also be layered in alternation with insulation films. Advantageously, the soft magnetic elements can be produced in a rapid solidification technique.

In a further development of the present invention, during winding of the toroid, the number n of strip layers are wound for an antenna core. After separation of the toroid, a number n of stacks is formed, from which n antenna cores are then produced by separation of the stack in the shell.

In a further modification of the method according to the invention, the following additional step is prescribed:

The soft magnetic properties (for example, permeability, configuration of the B-H loop, coercivity field strength, magnetostriction, etc.) are then set by heat treatment in the magnetic field on the soft magnetic element;

As an alternative, the elements can be cut individually and layered to the antenna core, preferably in a mounting element.

The antenna core, consisting of one or more soft magnetic elements, is preferably stabilized, in order to protect the elements and permit winding.

The antenna core can then be placed, on the one hand, between rectangular flat rods. The sandwich so produced can be modified by winding with adhesive tapes to a rod-like wound package. The reshaped antenna core can also be modified to a wound package with a curable resin.

It is also conceivable to insert the folded-back antenna core into a U-shaped profile, in order to lead to the final shape by winding with adhesive tapes.

The inductance of the rod antenna is tuned by adjusting the magnetic iron cross section $A_{Fe}$ of the antenna core, before stabilization to a wound package, by adding or removing individual strip layers or sections of strip layers to the inductance value later required for the antenna.

As an alternative, the inductance of the rod antenna, however, can also be tuned by adjusting the winding of the antenna core by adding or removing individual windings to the inductance value later required for the antenna. It can also be prescribed that both the inductance can be adjusted and the trend of the magnetic flux configured by adding other soft magnetic elements.

In addition, the inductance of the antenna can be tuned by adjusting winding of the foil package by moving the winding or individual windings, relative to the length of the antenna core, to the inductance value later required for the antenna.

The winding for the antenna being produced can be made from a strand, wire, cable or the like.

Typically, the edges of the antenna core have regular recesses, in which the winding wires for the antenna winding are secured. In addition, the spacing and position of the winding on the antenna core are clearly defined.

In a particular embodiment, the formed antenna stack is placed between two fiber mats, also called prepregs, impregnated beforehand with casting resin and precured. The assembly so produced is then pressed in a heated mold to an element with a freely shaped geometry. The body is finally fixed in this mold by curing of the resin.

The invention also pertains to the use of an antenna according to the invention in a vehicle. The incorporation between a moving part of the vehicle (for example, door) and its chassis is particularly advantageous.

BRIEF DESCRIPTION OF THE DRAWINGS

The invention is further described below by means of practical examples depicted in the figures of the drawing. In the drawing.

DETAILED DESCRIPTION

Figure 1:
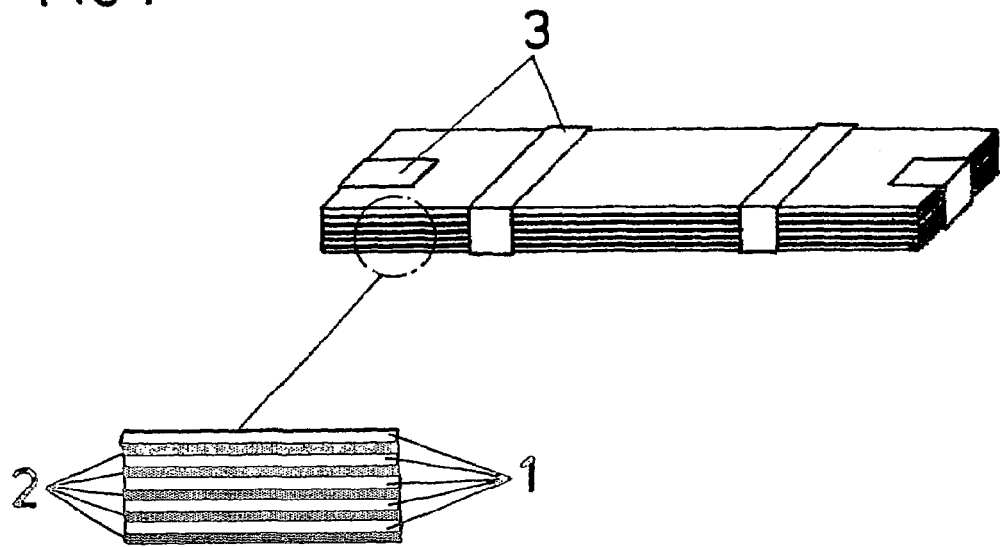
FIG. 1 shows a sketch of an antenna core according to the invention.

As can be gathered from FIG. 1, the antenna core according to the present invention consists of several elongated soft magnetic strips 1 layered in alternation from an amorphous or nanocrystalline alloy. If necessary, insulating films 2 that electrically insulate the strips 1 from each other lie between strips 1. In conjunction with corresponding evaluation electronics, the films can also be omitted, for example, during use in a vehicle access system. In addition, the antenna core is stabilized and fixed with some adhesive tapes 3.

Figure 2:
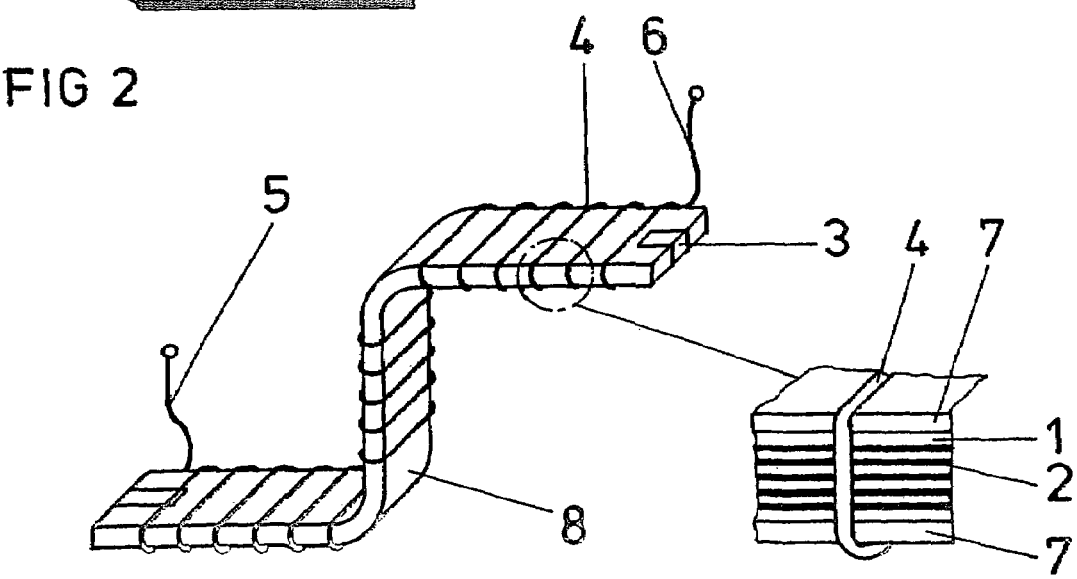
FIG. 2 shows a finished wound antenna, consisting of an antenna core according to the invention and a winding.

It is apparent from FIG. 2 that an antenna according to the invention has an elongated antenna core 8, provided with a winding 4. The ends 5, 6 of winding 4 permit supply and tapping of electrical current. The elongated antenna core is provided with stiffening strips 7, consisting of plastic, on the top and bottom for stabilization.

By using soft magnetic strips from an amorphous or nanocrystalline alloy with the lowest possible magnetostriction, which lies between $+4 \cdot 10^{-6}$ to $-4 \cdot 10^{-6}$, preferably $+1 \cdot 10^{-6}$ to $-1 \cdot 10^{-6}$, the significant distortion of the antenna core apparent from FIG. 2 by two times 90 degrees is possible without a significant change in soft magnetic and physical properties.

Figure 3:
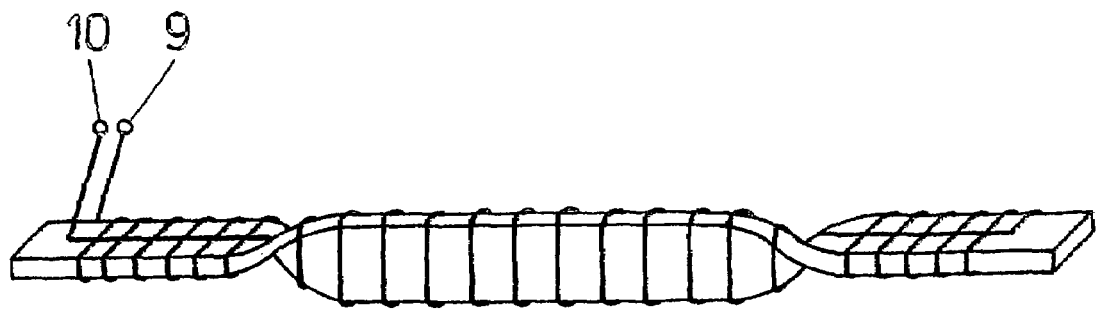
FIG. 3 shows an alternative embodiment of a finished wound antenna.

Another alternative variant of an antenna core according to the invention is apparent from FIG. 3. Here, there is the possibility of adapting the external shape to any necessary incorporation conditions by repeated torsion of the stack forming the antenna core without adversely affect the electrical and magnetic properties. In the depicted practical example, the two current connections 9, 10 were brought out of the winding only on one side.

Figure 4:
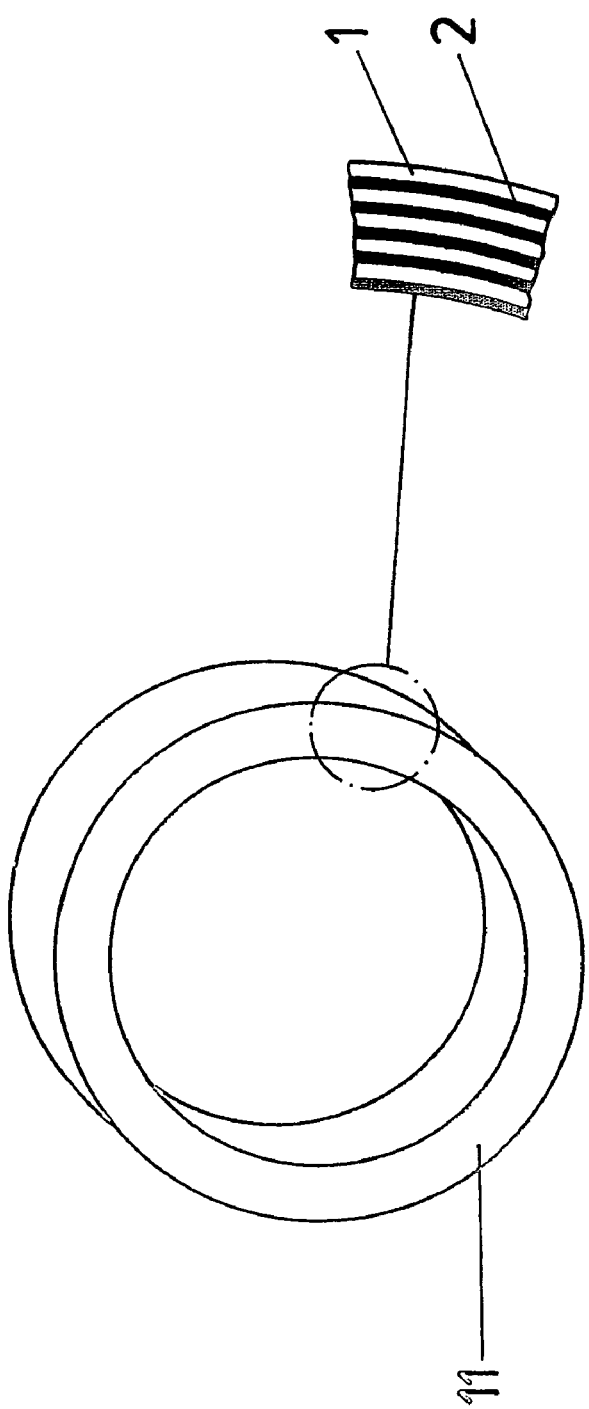
FIG. 4 shows an antenna core wound in bifilar fashion to a toroid.

As can be gathered from FIG. 4, a strip made of amorphous alloy is cast by means of a rapid solidification technique, which is then adjusted, with respect to its soft magnetic properties, by heat treatment in a magnetic field. This preferably occurs in the form of a coil.

Depending on whether it is prescribed to use an amorphous alloy or a nanocrystalline alloy, adjustment of the nanocrystalline structure occurs during this heat treatment.

The amorphous alloys are generally cobalt based alloys and the nanocrystalline alloys are generally iron based alloys. Both alloy systems have long been known in the technical world and are described, for example, in U.S. Pat. No. 5,567,537, cited in the introduction.

The alloy strips are then wound in bifilar fashion to a toroid 11, together with an electrically insulating film, which preferably consists of plastic and typically has a thickness from 0.5 to 30 μm. Each individual strip layer of the amorphous or nanocrystalline alloy strips is then electrically insulated by the film from the adjacent strip layers. The finished wound toroid 11 is shown in FIG. 4.

Figure 5:
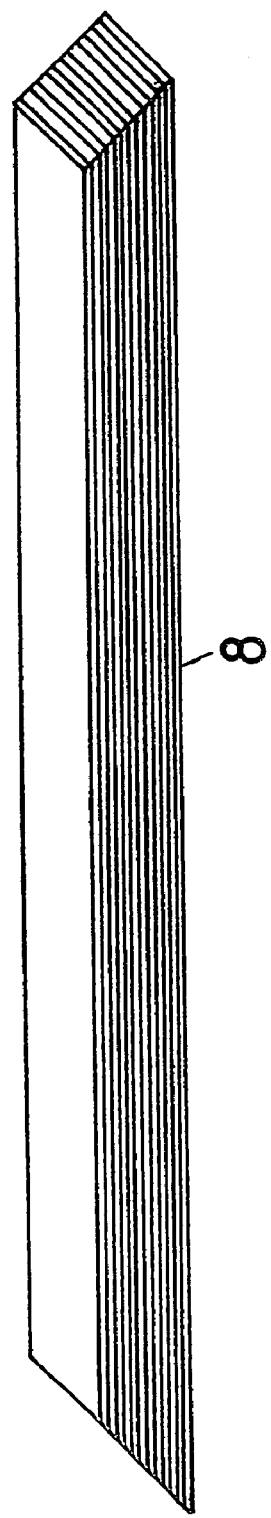
FIG. 5 shows an antenna core produced according to the invention by cutting of the toroid from FIG. 4 and then folding back.

This finished wound toroid is then separated at one site, folded back and reshaped to the elongated antenna core 8, which typically is configured trapezoidal on both ends after folding back, which is apparent from FIG. 5.

In order to demonstrate the effects of the structure according to the invention on the properties of the antenna, comparative measurements were conducted on sample antennas with the following alloys:

TABLE 1

| No. | Composition (at %) | $|\lambda_s|$ (ppm) |
|---|---|---|
| 1 | $Fe_{3.5}Co_{69.5}Mo_3Nb_1Si_{16}B_7$ | <0.2 |
| 2 | $Fe_{6.5}Co_{50.5}Ni_{20}Si_9B_{14}$ | 0.6 |
| 3 | $Fe_{24}Co_{12}Ni_{46}Si_2B_{16}$ | 11 |

As an example for an antenna, a stack of amorphous alloy strips from alloy no. 1, constructed in bifilar fashion, which is now marketed under the name Vitrovac® 6025 by the applicant, was produced. The employed alloy strips had a thickness of 23±3 μm. A plastic film made of Hostaphan® with a thickness of 6 μm was used as film.

The soft magnetic amorphous alloy strip, before processing to a stack, underwent field heat treatment at a temperature of 200° C. for about 18 hours across the strip direction. The resulting B-H loop is an essentially linear F loop. Because of this, an essentially linear B-H loop is obtained with a relatively small remanence ratio of less than 0.3.

The dimensions of the produced antenna core according to the invention were: length 750 mm, width 20 mm, 48 strip layers of amorphous alloy strip. The invention is particularly suitable for antennas with a length from 80, especially from 300 mm, i.e., especially for antennas of vehicle access systems.

The antenna core was provided with a winding with 110 windings of enameled copper wire with a diameter of 0.5 mm. The wound length of the antenna was about 700 mm in the center.

As an alternative to this antenna, an antenna (B) with identical dimensions from an identical starting material was produced, but without film insulation.

As a further alternative, an antenna (C) with identical dimensions and from a magnetic strip of thickness 17±3 μm was also produced, but without strip insulation. The soft magnetic material, before processing to an antenna, was subject to field heat treatment along the strip direction, which led to a so-called Z loop, i.e., a strong nonlinear, rectangular B-H loop with a high remanence ratio of greater than 0.7.

An antenna was also produced from a slightly magnetostrictive alloy 2 from Table 1 with strip insulation (D) and without strip insulation (E). The soft magnetic amorphous strip was subjected before processing to a stack to field heat treatment across the strip direction, in which heat treatment was conducted for 6 seconds at a temperature of 310° C. and the magnetic field was applied across the direction of the strip. A largely linear flat B-H loop was again achieved.

An antenna (F) was also produced from a strongly magnetostrictive alloy (alloy no. 3 from Table 1) with strip insulation. The employed soft magnetic amorphous alloy strip was also subjected to field heat treatment across the strip direction before processing to a stack, in which heat treatment was conducted for 6 seconds at a temperature of 350° C. across the strip direction. A largely linear B-H loop was again achieved.

The properties listed in Table 2 were then measured in the straight state and in the deformed state. Deformation was produced by bending of the corresponding antenna core by 20 cm in the center.

TABLE 2

|  | A | B | C | D | E | F |
|---|---|---|---|---|---|---|
| Inductance L in μH (at 60 kHz, 100 mV) | | | | | | |
| Straight | 748 | 423 | 106 | 836 | 518 | 300 |
| Deformed | 748 | 384 | 112 | 897 | 582 | 323-337 |
| Straight again | 748 | 487 | 106 | 836 | 518 | 312.5 |
| After loosening | 748 | 460 | 106 | 836 | 493 | 302.5 |
| Quality Q (at 60 kHz, 100 mV) | | | | | | |
| Straight | 20.3 | 1.9 | 3.7 | 17.8 | 1.8 | 24 |
| Deformed | 20.3 | 1.85 | 4.3 | 15.1 | 2.04 | 15 |
| Straight again | 20.3 | 2.11 | 3.7 | 17.8 | 1.8 | 18 |
| After loosening | 20.3 | 2.0 | 3.7 | 17.8 | 1.77 | 25 |

Whereas examples A and D have a high inductance L largely independent of deformation with simultaneously high quality Q, the comparative examples B, C, E and F have a partially stress-sensitive inductance L.

In the case of examples B, C and E, they also have a poorer quality Q.

In particular, certain changes in inductance are apparent in examples B and E, in comparison with variants A and D, as soon as the antenna stack is deformed and then bent straight again. These changes, however, are tolerable for typical transponder applications with appropriate control.

It is also striking that, in the case of comparative example C, a particularly low inductance value is obtained. In comparative example C, the B-H loop is rectangular. The low inductance value is all the more surprising, since the rectangular B-H loop is significantly steeper than the linear loop of the other examples, so that a clearly higher average permeability is present there. A much better inductance should therefore occur.

Comparative example F also showed unstable measured values and a very high sensitivity relative to mechanical loads.

In another experiment, an antenna sample with a torsion load by 180° and bending to a closed ring (circular shape) was measured. For this purpose, an antenna (G), made of a bifilar stack of amorphous alloy strips from alloy no. 1 of Table 1 with a thickness of 23±3 μm and a film made of plastic Hostaphan® with a thickness of 6 μm, was produced. The soft magnetic amorphous alloy strip, before processing to a stack, underwent field heat treatment across the strip direction, so that a largely linear flat F loop was present.

The dimensions of the produced antenna were: length 750 mm, width 20 mm, 60 strip layers in a winding with 80 windings of enameled copper wire with a diameter of 0.5 mm. The wound length was about 700 mm in the center.

The antenna core also exhibited excellent properties (Table 3) with respect to inductance L and quality Q.

TABLE 3

|  | G |
|---|---|
| Inductance L in µH (at 60 kHz, 100 mV) | |
| Straight | 756 |
| Circular form | 855 |
| Straight again | 756 |
| Torsion 180° | 756 |
| Quality Q (at 60 kHz, 100 mV) | |
| Straight | 22.2 |
| Circular form | 19.7 |
| Straight again | 22.2 |
| Torsion 180° | 22.2 |

Overall, antenna cores that can be mechanically loaded can therefore be produced with the present invention, which are also simple to produce industrially.

Figure 6:
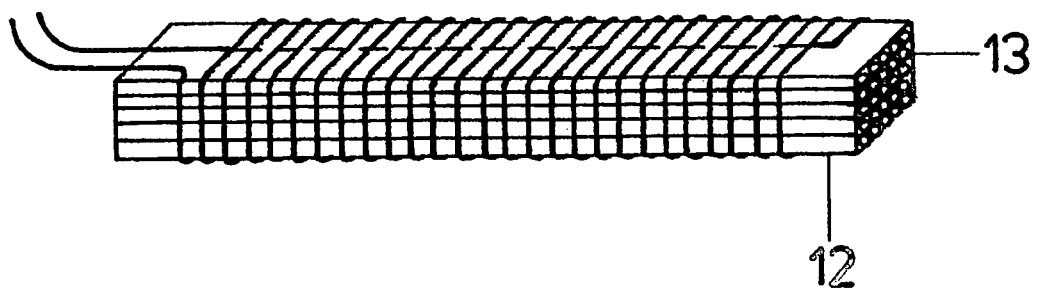
FIG. 6 shows a design of an antenna core from soft magnetic strand-like elements without insulation films.

FIG. 6 shows an antenna core 12, formed form strand-like soft magnetic elements 13, consisting of an amorphous and nanocrystalline alloy without an intermediate layer of insulating layers. This antenna core 12 has the advantage, relative to an antenna core from strip-like elements, that it can be more easily bended mechanically in all directions.

Figure 7:
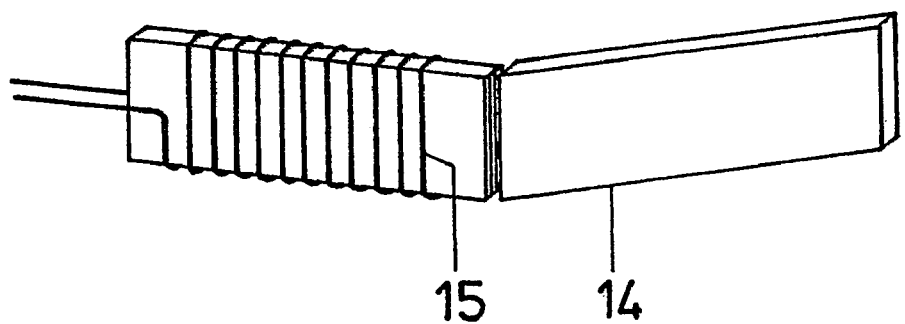
FIG. 7 shows a two-part, angled antenna core.

FIG. 7 shows an antenna core 14, designed in two parts, in which one part remains without winding, and the second part is provided with a winding 15. This is an example, indicating that the antenna core can contain additional parts for alignment or bundling of the magnetic flux, in addition to a laminate-like part.

Figure 8:
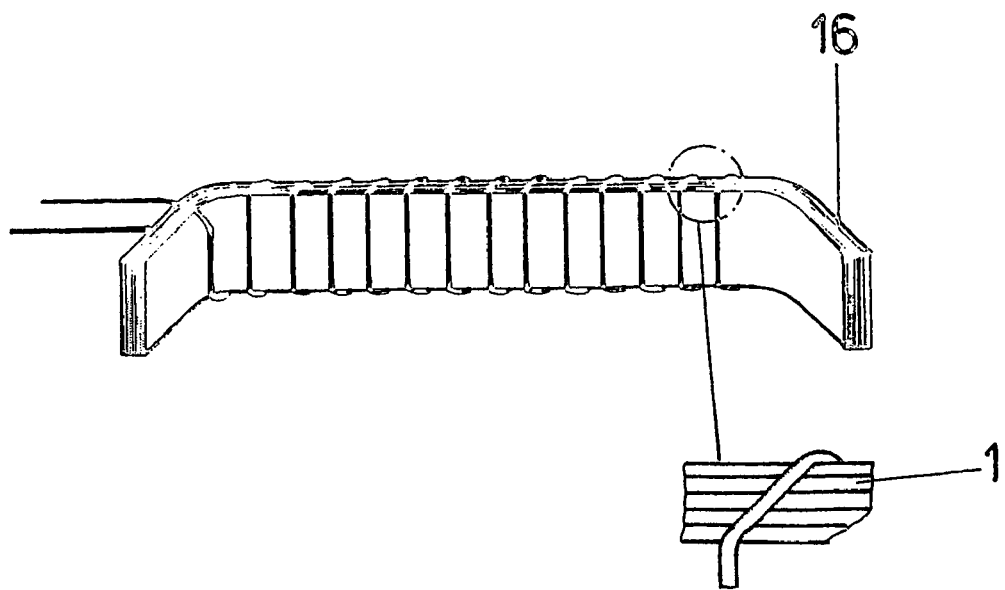
FIG. 8 shows an antenna core from soft magnetic strips without insulation films.

An antenna core 16, fixed in a bent shape and consisting exclusively of a layering of strip-like elements 1 rectangular in cross section without intermediate insulation layers, is apparent form FIG. 8. The strips 1, on the one hand, can be electrically separated from each other by their natural oxidation layers, and, on the other hand, also by other surface layers that can be produced, for example, by chemical pretreatment. In the individual case, contacting through surface roughness of the strips can be produced in certain locations, but the eddy current losses remain in the tolerable range for typical applications in the transponder field, for example, in the range around 125 kHz and the electronics used there.

Figure 9:
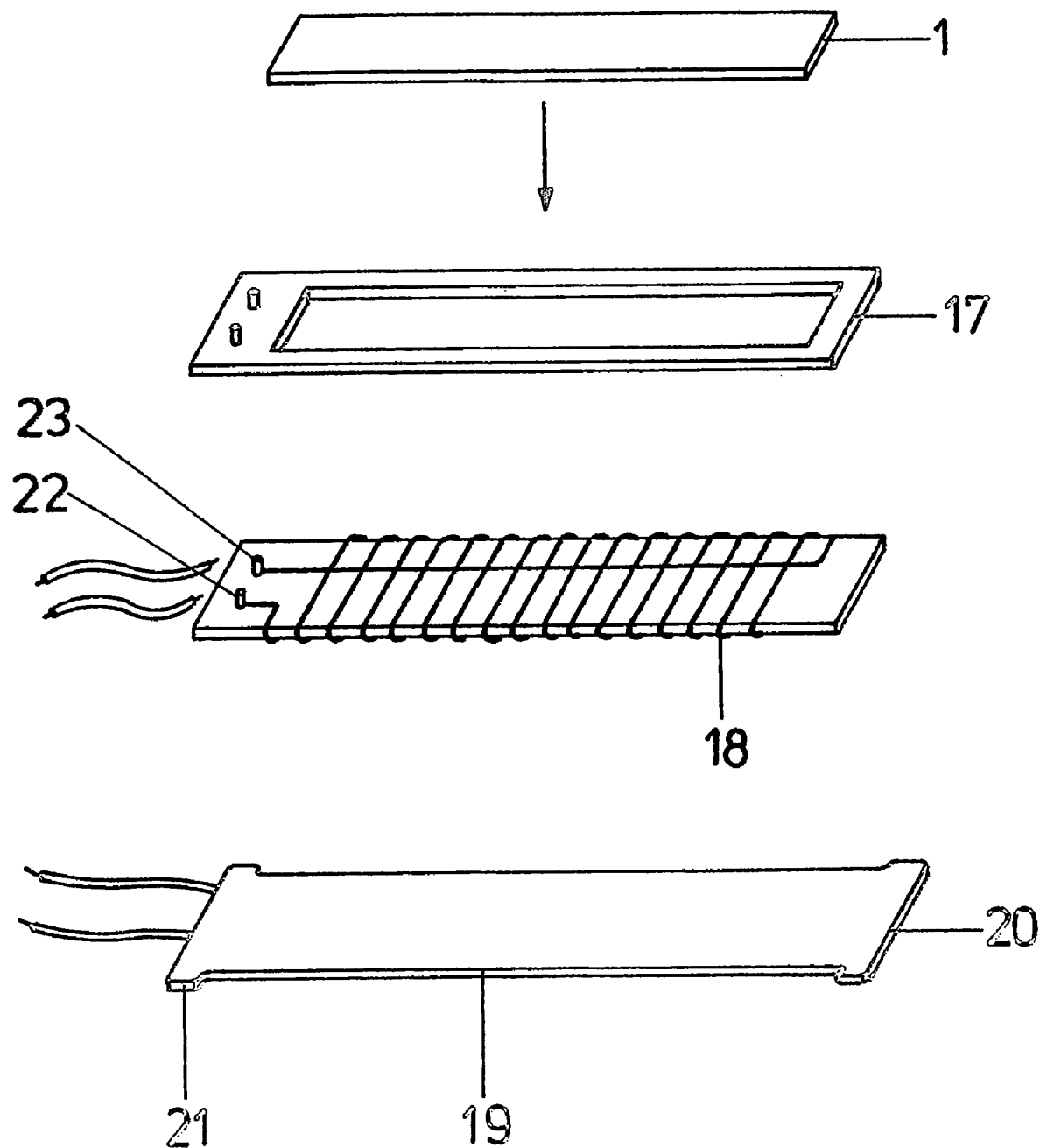
FIG. 9 shows steps of the production method of an antenna.

A method for production of an antenna core, in which the strips 1 are inserted in succession into a mold 17, which is designed as an open frame, is apparent from FIG. 9. This frame, however, can have a thin frame, in turn. A winding 18 can be applied to it, which can be wound, for example, in the notches that are arranged in the outer edges of frame 17. In the next step, the intermediate product so formed can be glued, cast or wound with strip layers, and then a shrinkage tube 19 applied and shrunk. In the lowermost part of FIG. 9, the shrinkage tube is shown in the shrunken form. The ends 20, 21 of the antenna core are pressed flat and wide there by embossing with a compression die, so that the shrinkage tube can also be tightly bonded on the ends to the inner part of the antenna core.

The shrinkage tube, however, can also be coated on its ends with an adhesive, for example, a hot-melt adhesive that permits tight bonding to the parts of the antenna core to be included.

The connections 22, 23 of the antenna core are fastened to frame 17 and serve for fastening and contacting of the two ends of winding 18. A line can be connected there, which emerges from the shrinkage tube on end 21.

It can also be prescribed to additionally insert other soft magnetic parts in frame 17 that serve to guide the magnetic flux. For this purpose, it can also be prescribed that before insertion of strips 1, specific soft magnetic parts be already integrated in the frame 17 as a sort of pole shoe, or that the frame 17 already entirely consist of a soft magnetic material.

Frame 17 can also exist already in a three-dimensionally bent shape before insertion of strips 1, or can be bent to the prescribed three-dimensional shape with the strips after their insertion.

Figure 10:
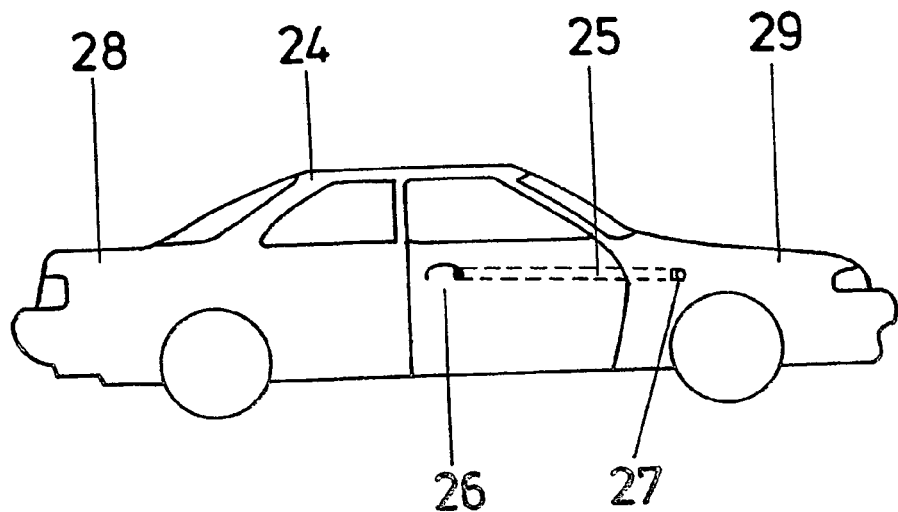
FIGS. 10 and 11 show a vehicle in profile.

FIG. 10 shows a vehicle 24, in which, in the region of the right passenger door, and antenna 25 for a transponder is integrated. As shown, the antenna extends from the door handle 26 to a blinking light 27, in whose vicinity the auto body of the vehicle is perforated, so that one end of the antenna can also emerge from the metal outer shell of the vehicle. A corresponding antenna can also be arranged in the same way in the region of the rear hatch 28 or hood 29 or a rear door. In the region of the hatch, the antenna can then emerge at the hatch handle, on the one hand, and out a rear window, and in the region of the hood, it can emerge on the front edge of the hood, on the one side, and in the region of the front panel, on the other. In this manner, a large antenna length is achieved, in which the antenna ends protrude from the metal outer shell of the vehicle, but in which the possible bendability of the antenna according to the invention, with retention of full functional capability, even during opening of the door, is a prerequisite.

Figure 11:
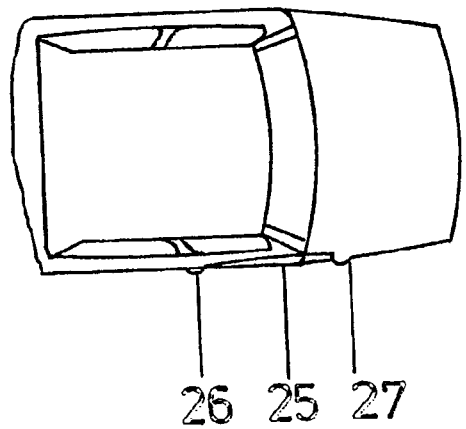

FIG. 11 shows a view of the vehicle of FIG. 10 from the top, in which the antenna 25 is shown in stretched form with a closed passenger door.

Figure 12:
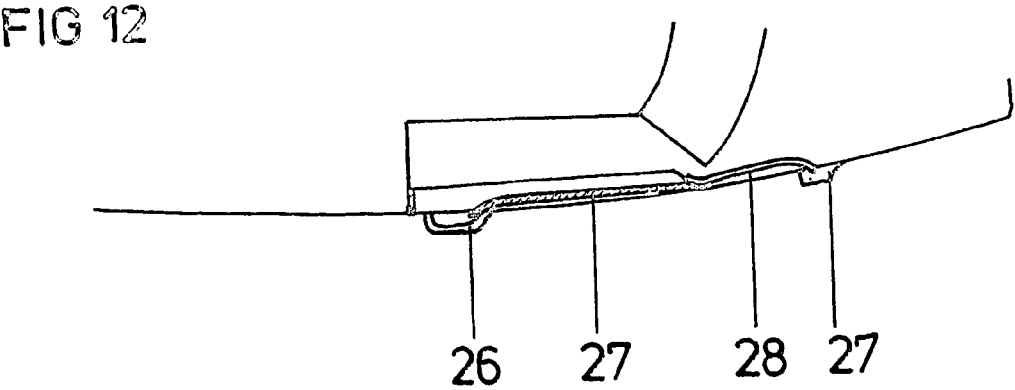
FIG. 12 shows the incorporation of an antenna according to the invention in a vehicle.

FIG. 12 shows an enlarged view of the region, in which antenna 27 is situated. 28 denotes an area, in which the antenna is not provided with a winding, therefore it serves essentially to guide the magnetic flux.

Several antennas according to the invention can also be provided on a vehicle of the depicted type, in order to achieve a larger transmitting/receiving range, or to be sensitive to different alignments of the magnetic field.

An application both for operating devices of the locking system of a vehicle and recognition and identification applications are also conceivable.

The antenna core according to the present invention can also be used in detection systems for theft security systems as the transmitting and/or receiving antennas, in addition to use in vehicles. Such theft security systems are described, for example, in EP 0 121 649 B2 or U.S. Pat. No. 4,150,981. However, applications, especially as stationary antennas in individual recording and/or access systems, are also conceivable, for example, stationary antennas for identification and accounting of ski passes.

What is claimed is:

1. An antenna core at least 80 mm long with at least one flexible soft magnetic element of an amorphous or nanocrystalline alloy, wherein the amorphous and nanocrystalline alloy has a magnetostriction value $\lambda_s$ in the range from $4 \cdot 10^{-6}$ to $-4 \cdot 10^{-6}$, wherein the antenna core, when wound with a wire to form a coil, has a linear B-H loop, and the inductance L of the antenna core at 60 kHz changes by less than 10% during bending of 25% of its length in the center.

2. An antenna core according to claim 1, wherein the alloy has a magnetostriction value of $\lambda_s$ in the range from $1\cdot 10^{-6}$ to $-1\cdot 10^{-6}$.

3. An antenna core according to claim 1, wherein the quality is greater than 10 at 60 kHz.

4. An antenna core according to claim 1, wherein the elements are strands.

5. An antenna core according to claim 1, wherein the elements are flat strips rectangular in cross section.

6. An antenna core according to claim 5, wherein the elongated soft magnetic strips have a thickness of 5-30 μm.

7. An antenna core according to claim 1, wherein the elements are separated from each other by electrically insulating films.

8. An antenna core according to claim 7, wherein the electrically insulating films consist of plastic.

9. An antenna core according to claim 7, wherein the films have at thickness from 0.5 to 30 μm.

10. A method for production of an antenna core comprising the steps of:
  winding one or more soft magnetic elements to a toroid, wherein the flexible soft magnetic element is made of an amorphous or nanocrystalline alloy and has a magnetostriction value $\lambda_s$ in the range from $4\cdot 10^{-6}$ to $-4\cdot 10^{-6}$, and wherein the amorphous or nanocrystalline alloy has a linear B-H loop, and that the inductance L of the antenna core at 60 kHz changes by less than 10% during bending of 25% of its length in the center,
  separating the wound toroid at one site, folding back and reshaping it to an elongated antenna core.

11. A method according to claim 10, wherein the elements are produced in a rapid solidification technique.

12. A method according to claim 10, wherein the elements are set, with respect to their soft magnetic properties, by means of heat treatment in a magnetic field.

13. A method according to claim 10, wherein the antenna core is placed between two rectangular flat rods, and the flat rods and antenna core are formed to a rod-like wound package by winding with adhesive tapes or casting or impregnation with a curable plastic and then curing.

14. A method according to claim 13, wherein additional ferromagnetic elements to influence the alignment of the magnetic flux are added before winding with adhesive tapes or casting or impregnation.

15. A method according to claim 10, wherein the antenna core is formed by insertion between two fiber mats, impregnated beforehand with casting resin and precured, in a mold, and then heating of the mold to a rod-like wound package.

16. A method according to claim 10, wherein recesses are made in the edges of the antenna core that accommodate the winding wires for the antenna winding.

17. A method according to claim 16, wherein the recesses are regularly incorporated, so that the spacing and position of the windings of the antenna winding are exactly defined.

18. A method for production of an antenna with an antenna core comprising the steps of:
  providing an antenna core at least 80 mm long with at least one flexible soft magnetic element made of an amorphous or nanocrystalline alloy having a magnetostriction value $\lambda_s$ in the range from $4\cdot 10^{-6}$ to $-4\cdot 10^{-6}$, wherein the amorphous or nanocrystalline alloy has a linear B-H loop, and that the inductance L of the antenna core at 60 kHz changes by less than 10% during bending of 25% of its length in the center;
  stabilizing the elongated antenna core mechanically to a wound package; and
  providing the elongated antenna core with a winding.

19. A method for production of an antenna with an antenna core being at least 80 mm long with at least one flexible soft magnetic element made of an amorphous or nanocrystalline alloy, wherein the amorphous and nanocrystalline alloy has a magnetostriction value $\lambda_s$ in the range from $4\cdot 10^{-6}$ to $-4\cdot 10^{-6}$, wherein the soft magnetic elements are inserted into a frame made of a stable material and the provided with a winding, and that the antenna element so produced is covered with a shrinkage tube, at least in the region of the winding.

20. A method according to claim 19, wherein the shrinkage tube, at least in the region of its ends, is coated with an adhesive, especially a hot melt adhesive, on the inside, by means of which it is glued to the antenna core or itself.

21. A method for production of an antenna with an antenna core being at least 80 mm long with at least one flexible soft magnetic element made of an amorphous or nanocrystalline alloy, wherein the amorphous and nanocrystalline alloy has a magnetostriction value $\lambda_s$ in the range from $4\cdot 10^{-6}$ to $-4\cdot 10^{-6}$, wherein the soft magnetic elements are inserted into a frame made of a stable material and then provided with a winding, and that the antenna element so produced, at least in the region of the winding, is covered with a shroud and glued, and that the ends of the antenna element are provided with a shrinkage tube for sealing, which is coated, especially on the inside, with an adhesive.

22. A method comprising the steps of:
  providing an antenna being at least 80 mm long with at least one flexible soft magnetic element made of an amorphous or nanocrystalline alloy, wherein the amorphous and nanocrystalline alloy has a magnetostriction value $\lambda_s$ in the range from $4\cdot 10^{-6}$ to $-4\cdot 10^{-6}$, wherein the amorphous or nanocrystalline alloy has a linear B-H loop, and the inductance L of the antenna core at 60 kHz changes by less than 10% during bending of 25% of its length in the center, and using said antenna in a vehicle.

23. A method according to claim 22, wherein the antenna has two regions, one region of the antenna of which is fastened to the chassis, and the other region is fastened to an element movable relative to the chassis.

24. A method comprising the steps of:
  providing an antenna being at least 80 mm long with at least one flexible soft magnetic element made of an amorphous or nanocrystalline alloy, wherein the amorphous and nanocrystalline alloy has a magnetostriction value $\lambda_s$ in the range from $4\cdot 10^{-6}$ to $-4\cdot 10^{-6}$, wherein the amorphous or nanocrystalline alloy has a linear B-H loop, and the inductance L of the antenna core at 60 kHz changes by less than 10% during bending of 25% of its length in the center, and using the antenna for personal recording and/or access systems.

* * * * *